US012658016B2

(12) United States Patent
Dobrusskin et al.

(10) Patent No.: US 12,658,016 B2
(45) Date of Patent: Jun. 16, 2026

(54) MONITORING SYSTEM AND METHOD

(71) Applicant: KONINKLIJKE PHILIPS N.V., Eindhoven (NL)

(72) Inventors: Christoph Dobrusskin, Nuenen (NL); I-Chih Kang, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 44 days.

(21) Appl. No.: 18/293,520

(22) PCT Filed: Aug. 1, 2022

(86) PCT No.: PCT/EP2022/071491
§ 371 (c)(1),
(2) Date: Jan. 30, 2024

(87) PCT Pub. No.: WO2023/012082
PCT Pub. Date: Feb. 9, 2023

(65) Prior Publication Data

US 2024/0346903 A1 Oct. 17, 2024

(30) Foreign Application Priority Data

Aug. 4, 2021 (EP) .................................... 21189541

(51) Int. Cl.
*G08B 21/02* (2006.01)

(52) U.S. Cl.
CPC ................................ *G08B 21/0208* (2013.01)

(58) Field of Classification Search
CPC ............ G08B 21/0208; G08B 21/0205; G08B 21/0202; G08B 21/02; G08B 21/028
See application file for complete search history.

(56) References Cited

U.S. PATENT DOCUMENTS

| | | | | | |
|---|---|---|---|---|---|
| 6,072,392 | A * | 6/2000 | Henderson | G08B 15/004 367/198 |
| 6,496,115 | B2 | 12/2002 | Arakawa | |
| 6,989,744 | B2 * | 1/2006 | Proebsting | G08B 23/00 381/328 |
| 7,266,347 | B2 * | 9/2007 | Gross | G08C 17/00 455/67.11 |
| 9,009,038 | B2 | 4/2015 | Hong et al. | |
| 9,277,870 | B2 * | 3/2016 | Spolin | A61B 5/746 |
| 10,410,496 | B1 | 9/2019 | Child et al. | |

(Continued)

FOREIGN PATENT DOCUMENTS

EP 1872818 A1 1/2008

OTHER PUBLICATIONS https://www.dunstanbaby.com/, downloaded on Jan. 30, 2024.

(Continued)

*Primary Examiner* — Curtis J King

(57) ABSTRACT

A baby monitor system and method has a baby monitor unit which collects sounds of a baby to be monitored. The sounds collected are analyzed and crying sounds are identified and categorized into a set of different crying types. A first alert for a first carer receiver unit is generated for a first sub-set of crying types and a second alert is generated for a second carer receiver unit for a second, different, sub-set of crying types. Thus, two (or more) carers can be allocated care responsibility for the baby for different crying types, to provide a division of care.

20 Claims, 3 Drawing Sheets

(56) References Cited

U.S. PATENT DOCUMENTS

| | | | | |
|---|---|---|---|---|
| 10,832,553 | B2 | 11/2020 | Mosebach et al. | |
| 2006/0232428 | A1* | 10/2006 | Desrosiers | G08B 21/02 340/539.15 |
| 2010/0090834 | A1* | 4/2010 | Buchnick | G08B 21/0446 340/573.1 |
| 2010/0312579 | A1* | 12/2010 | Firminger | G16H 50/20 705/3 |
| 2013/0181833 | A1* | 7/2013 | Al-Ali | G09B 21/003 340/539.12 |
| 2014/0320312 | A1 | 10/2014 | Sager et al. | |
| 2015/0094830 | A1 | 4/2015 | Lipoma et al. | |
| 2015/0182406 | A1* | 7/2015 | Falk | A61F 7/10 600/22 |
| 2015/0288877 | A1* | 10/2015 | Glazer | H04N 23/56 348/77 |
| 2016/0035205 | A1* | 2/2016 | Messenger | G16H 40/67 340/539.15 |
| 2016/0310067 | A1* | 10/2016 | Heinrich | H04N 7/183 |
| 2017/0125034 | A1* | 5/2017 | Kakadiaris | G06F 3/165 |
| 2018/0035082 | A1* | 2/2018 | Patil | A61B 5/45 |
| 2019/0026066 | A1* | 1/2019 | Champy | G08B 21/18 |
| 2019/0130720 | A1* | 5/2019 | Lui | G06V 10/82 |
| 2022/0157143 | A1* | 5/2022 | Panneer Selvam | G04G 9/007 |
| 2022/0166851 | A1* | 5/2022 | Fong | G16Y 20/20 |
| 2024/0346903 | A1* | 10/2024 | Dobrusskin | G08B 21/0208 |

OTHER PUBLICATIONS

Liu et al., "Infant cry language analysis and recognition: an experimental approach", IEEE/CAA Journal of Automatica Sinica Chinese Association of Automation (CAA), vol. 6, No. 3, May 1, 2019, pp. 778-788.

International Search report and Written Opinion of PCT/EP2022/071491, dated Nov. 25, 2022.

* cited by examiner

MONITORING SYSTEM AND METHOD

CROSS-REFERENCE TO PRIOR APPLICATIONS

This application is the U.S. National Phase application under 35 U.S.C. § 371 of International Application No. PCT/EP2022/071491, filed on Aug. 1, 2022, which claims the benefit of European Patent Application No. 21189541.2, filed on Aug. 4, 2021. These applications are hereby incorporated by reference herein.

FIELD OF THE INVENTION

This invention relates to monitor systems, in particular having relay of audio (and optionally video) between a remote monitor and a receiver unit. The invention in particular relates to a baby monitoring system, in which the remote monitor is a baby monitor unit and the receiver unit is a carer (e.g. parent) receiver unit.

BACKGROUND OF THE INVENTION

A conventional baby monitor consists of a baby unit which captures the activities of a baby and a parent unit that outputs the captured audio and optionally also displays the captured video.

Parents use the system to monitor their baby in a remote room.

Different types of baby monitors exist:

- Audio monitors consist of a baby unit and a parent unit and use sound only for monitoring;
- Video monitors consist of a baby unit and a parent unit and can transmit audio and video for monitoring;
- Connected video monitors are connected to a Wi-Fi network and the internet and allow monitoring the baby through a smartphone app; and
- Dual-mode monitors consist of a baby unit and parent unit, but also allow the baby unit to connect to Wi-Fi and enable app access.

Typically, baby monitors can alert the parents when the baby is detected to be crying, triggering the parents to attend to the baby's needs. This is usually done by measuring the sound level captured by the baby unit's microphone and comparing with a threshold.

More advanced baby monitors use a specific algorithm tailored to detect the crying sound, and only trigger an alert when crying sounds, rather than other types of sounds, are detected.

An even more advanced version of cry sound analysis is to be able to analyze the cry sounds and to determine what the baby needs. For example, the so-called Dunstan baby language has been devised, which can classify a baby's cries into five categories: hungry, sleepy, discomfort, need to burp, stomach pain.

Identifying the type of cry sound typically requires human training, but audio processing algorithms have also been devised that can automatically categorize the different baby cries. Such algorithms are also available as smartphone apps (e.g. CryTranslator).

A baby monitor which incorporates this cry detection functionality is for example disclosed in US 2016/0035205. The system analyzes cry patterns and learns from user input to be able to recognize the different cry sounds.

Current baby monitors either alert one parent or carer at a time, for example the one that happens to be near the parent unit, or both parents simultaneously for example through an app running on both parents' smartphones and/or smart watches.

Parenting is becoming more and more a shared responsibility of both parents. This means that the tasks of attending to the baby's needs are divided between both parents. It is thus also known for baby monitors to enable parents to share the responsibility for attending to a baby based on a timing schedule. US 2016/0035205 discloses allocating on-duty and off-duty time periods to different carers (e.g. parents). Thus, multiple carers are able to allocate times when they are responsible for the baby and the system will alert the correct carer. It also includes cry analysis for example to determine possible causes of crying.

In this way, neither carer will be overloaded and can still have some time for him/herself to rest or perform other tasks while the other carer attends to the baby. Some tasks have to be done by one specific parent, e.g. if the baby is breast-feeding and not bottle feeding, so a simple time-sharing approach is not always appropriate.

SUMMARY OF THE INVENTION

The invention is defined by the claims.

According to examples in accordance with an aspect of the invention, there is provided a baby monitor system, comprising:

- a baby monitor unit having a microphone for collecting sounds of a baby to be monitored and an output system for providing alerts to a set of at least two carer receiver units; and
- a processor arrangement for triggering alerts for one or more of the carer receiver units,
- wherein the processor arrangement is adapted to:
  - analyze the sounds collected by the baby monitor unit;
  - identify crying from the analyzed sounds and categorize the crying as one of a set of different crying types;
  - generate a first alert trigger signal for triggering a first alert to a first carer receiver unit in response to the crying being one of a first sub-set of crying types; and
  - generate a second alert trigger signal for triggering a second alert to a second carer receiver unit in response to the crying being one of a second sub-set of crying types, different to the first sub-set of crying types.

The first and second sub-sets are different in that they have non-identical members. There may be overlap between the first and second sub-sets; for example both carers may be alerted for some crying types.

The system of the invention supports carers (typically parents) with sharing of baby care tasks. The division of tasks is based on the baby's needs, and each carer can agree to be the default person to attend to specific needs (such as the baby being hungry, sleepy, experiencing discomfort, needing to burp, or having stomach pain). The invention identifies the need through baby cry translation and can then alert the right carer for each need. In this way, it is always clear which parent will attend to the baby and the other parent is not disturbed.

The carer receiver units each have an associated identity, and the processor arrangement is aware (e.g. by an initial configuration stage) of the types of alert which each receiver unit wishes to receive.

The invention may be implemented by the baby monitor unit and may use standard receiver units. The system preferences are for example set by the user (i.e. the carers), and they may be updated at any time.

The set of crying types for example include a hunger crying type and at least one non-hunger crying type.

The most basic division of crying types can distinguish between a baby that needs feeding and a baby that has other needs (such as needing a nappy change when there is discomfort). In this way, the mother, if breast feeding, will want the alert when the baby needs feeding.

The first sub-set for example includes the hunger crying type and the second sub-set does not include the hunger crying type. Thus, one carer (e.g. mother) is alerted when feeding is needed, and the other carer (e.g. father) is not. The father in this case takes responsibility for other baby needs.

The non-hunger crying types for example include: sleepy, discomfort, need to burp and stomach pain.

There may be multiple reasons for the baby to be unsettled other than the desire to feed. By allocating different needs to different carers, a desired overall balance of responsibilities can be achieved.

The baby monitor unit may comprise a health monitoring system, wherein the processor arrangement is further adapted to use baby health monitoring information to generate the first and second alerts.

Thus, the general health status of the baby may be used to determine if an alert is needed for example regardless of crying. This may relate to breathing patterns, heartrate or temperature.

Each carer monitor unit may comprise a sleep monitor system, and the processor arrangement is further adapted to use carer sleep monitoring information to generate the first and second alerts. For example, there may be a default to a carer who is awake when the other is asleep.

The carer monitor unit may also comprise a health monitoring system, wherein the processor arrangement is further adapted to use carer health monitoring information to generate the first and second alerts.

The processor arrangement may be further adapted to take account of carer schedule information to generate the first and second alerts.

A carer may want to not be disturbed at particular times, for example based on past or future important or exhausting meeting appointments, or the time that a person needs to get up.

The processor arrangement may be further adapted to take account of a response time to an alert trigger signal in order to change the characteristics of the alert trigger signal or to switch to a different alert trigger signal.

The baby monitor unit may comprise a camera for capturing and the monitor units comprise a display for displaying the video. Thus, the system may be an audio and video baby monitoring system.

The system may further comprise the set of at least two carer receiver units. Each carer receiver unit for example comprises a smart watch and/or smartphone on which a suitable app has been loaded.

The invention also provides a baby monitoring method, comprising:

- collecting sounds of a baby to be monitored at a baby monitor unit; and
- providing signals for triggering the generation of alerts for one or more carer receiver units by:
  - analyzing the sounds collected by the baby monitor unit;
  - identifying crying from the analyzed sounds and categorize the crying as one of a set of different crying types;
  - generating a first alert trigger signal for triggering a first alert to a first carer receiver unit in response to the crying being one of a first sub-set of crying types; and
  - generating a second alert trigger signal for triggering a second alert to a second carer receiver unit in response to the crying being one of a second sub-set of crying types, different to the first sub-set of crying types.

The set of crying types may include a hunger crying type and at least one non-hunger crying type and wherein optionally the non-hunger crying types include: sleepy, discomfort, need to burp and stomach pain.

The method may comprise using carer sleep monitoring information and optionally health monitoring related information of the baby and/or carers, and/or appointment related information for a carers, as described above, to generate the first and second alerts.

The invention also provides a computer program comprising computer program code means which is adapted, when run on the processor arrangement of the baby monitoring system defined above, to implement the method as also defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
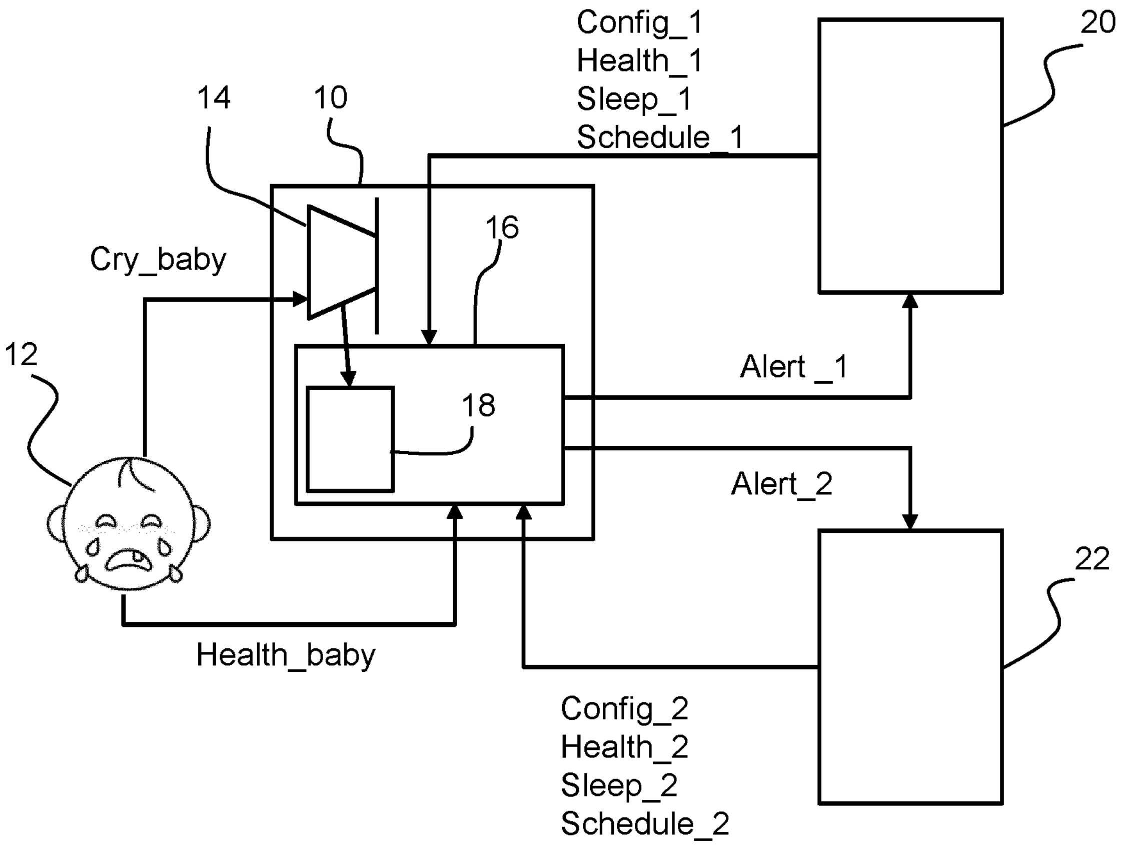
FIG. 1 shows a first example of a baby monitor system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a baby monitor system (and method) having a baby monitor unit which collects sounds of a baby to be monitored. The sounds collected are analyzed and crying sounds are identified and categorized into a set of different crying types. A first alert is generated for a first carer receiver unit for a first sub-set of crying types and a second alert is generated for a second carer receiver unit for a second, different, sub-set of crying types. Thus, two (or more) carers can allocate care responsibility for the baby for different crying types, to provide a division of care.

FIG. 1 shows a baby monitoring system, comprising a baby monitor unit 10 for sensing sounds made by a baby 12.

The baby monitor unit 10 has a microphone 14 for collecting sounds Cry_baby of a baby to be monitored. The system is for providing alerts to a set of at least two carer receiver units 20, 22.

The system has a processor arrangement 16 generating alerts for one or more of the carer receiver units 20, 22. In the example of FIG. 1, the processor arrangement 16 is part of the baby monitor unit 10.

The carer receiver units 20, 22 for example comprise a smart watch for each carer. The smart watch can alert the carer by vibration, sound and/or light. There may also be other alarm systems which are activated by the carer receiving units. Typically, the smart watch is activated by a smartphone of the carer, so that each receiver unit 20, 22 may be considered to comprise the combination of a smart watch and smartphone, but it could equally just be a smartphone, or an independent smart watch, or indeed a dedicated receiver unit.

The baby monitor unit 10 communicates wirelessly with the carer receiver units 20, 22, and thus each have suitable wireless connectivity modules. This wireless communication is typically via Bluetooth Low Energy (BLE) or WiFi.

The processor arrangement 16 operates a baby cry detection algorithm shown as unit 18. The cry detection algorithm 18 is used to analyze the sounds collected by the microphone 14 of the baby monitor unit 10 and identify crying from the analyzed sounds.

Furthermore, identified crying is categorized as being one of a set of different crying types.

The most basic division of crying types can distinguish between a baby that is crying because it needs feeding, and a baby that is crying for other reasons, and hence with other needs (such as needing a nappy change when there is discomfort).

However, there may be more than two crying types. As mentioned above, cry analysis systems are known which can distinguish five crying types; the baby being hungry, sleepy, in discomfort, needing to burp, and having stomach pain. However, there may be different numbers of crying types than 2 or 5, and they may be different to those defined above. For instance, there are also algorithms that can assess the baby's emotions such as bored or angry.

The system (and in particular the processor arrangement 16 of the baby monitor unit in the example of FIG. 1) then generates alerts for the two carers (e.g. parents) in dependence on the cry analysis and in particular the crying type. The system then generates one or both of a first alert Alert_1 to the first carer receiver unit 20 for a first carer and a second alert Alert_2 to the second carer receiver unit 22 for a second carer. The alerts can be implemented by mobile push notifications to the smartphones of the carers.

In particular, whether or not each alert is generated depends on the crying type. There may be some crying types for which only one carer is alerted (e.g. for feeding) and another crying type for which only the other carer is alerted. There may also be some crying types which result in alerts to both carers, e.g. potential emergency situations.

In general, the first alert Alert_1 is generated in response to the crying being one of a first sub-set of crying types and the second alert Alert_2 is generated in response to the crying being one of a second sub-set of crying types. The two sub-sets are different so that there is division of responsibility between the carers as to the different crying types for which they are responsible.

To distinguish between a baby needing feeding and a baby having other needs, the first sub-set will include the hunger crying type and the second sub-set will not include the hunger crying type. Thus, one carer (e.g. mother) is alerted when feeding is needed, and the other carer (e.g. father) is not. The father in this case takes responsibility for other baby needs, resulting in other crying types. By using more crying types, different needs can be allocated to different carers, and thereby a desired overall balance of responsibilities can be achieved.

The system thus supports carers (typically parents) with sharing of baby care tasks. The division of tasks is based on the baby's needs, and each carer can agree to be the default person to attend to specific needs (such as the baby being hungry, sleepy, in discomfort, needing to burp, having stomach pain). The invention identifies the need through baby cry translation and can then alert the right carer for each need. In this way, it is always clear which carer will attend to the baby and the other carer is not disturbed.

In order to set the rules for which crying types trigger the different alerts, the carers provide configuration settings Config_1 and Config_2 to the baby monitor unit 10 using their receiver units 20, 22. For example, a user interface is provided by a smartphone app. This configuration information may be updated at any time to enable the carers to update their division of responsibility.

Functionality may also be provided such that the first (alerted) caregiver can also acknowledge the alert. If this does not happen after an appropriate reaction time has passed, a second (previously not alerted) caregiver is alerted.

The invention may be implemented by the baby monitor unit and may use standard receiver units. In such a case, the configuration information may be provided directly to the baby monitor unit 10, simply identifying those carer receiver units 20, 22 to which the configured alerts should be sent.

Note that in this example, the alert configuration is set in the baby monitor unit 10. However, the alerts may be configured locally at the carer receiver units, managed by apps loaded onto those units. The alert configuration may instead be performed in a backend server running in the cloud, which is usually present in a connected baby monitor system.

Thus, the processor arrangement 16 may reside at least in part in the receiver units or in an external processor. The functionality described above may also be divided between different locations. For example the cry detection algorithm 18 may be located remotely for remote cloud processing, whereas the configuration of alerts (in dependence on the crying type that has been identified) may be implemented locally at either the baby monitor unit or at the carer receiving units.

The implementation of the invention can be achieved in software only and can thereby by introduced even in products already on the market by means of a firmware and app upgrade.

FIG. 1 shows some additional optional functionality to the system.

The carer receiver units 20, 22 in this example each include (or connect to) a sleep monitor system. This provides sleep monitoring information Sleep_1 and Sleep_2 to the processing arrangement, which is further adapted to use the carer sleep monitoring information to generate the first and second alerts. Thus, the sleep state of the carers may be used to divide responsibility additionally based on sleep information. This may depend on sleep patterns, sleep needs and deficiencies and the current sleep stage.

Sleep monitoring may be implemented using wearable devices such as smart watches, or remotely using other sensor based systems. By taking account of the sleep condition of the carers, the system can for example default to a carer who is awake when the other is asleep.

Further monitoring may also provide baby health information Health baby and carer health information Health_1 and Health_2 to the processing arrangement. This health information may include general health data such as breathing patterns, heartrate and temperature. This enables alerts to be generated which depend not only on crying types. Alerts may be generated even when the baby is not crying, and the carer to be alerted may also depend on the carer health information.

FIG. 1 also shows that the carer receiving units can provide schedule information Schedule_1 and Schedule_2, This may relate to past or future important or exhausting meeting appointments, or the time that a person needs to get up.

An example will be explained of how the additional inputs are used. If the baby is crying, the baby monitor will analyze both the crying type and also the most recent health data (such as heart rate, respiratory rate, movement) of both carers. From all of this information it will then determine which carer is most suitable to wake up. It then will send a notification to the specific receiver unit (e.g. smartwatch) of that carer. In this way only one carer (e.g. parent) is woken up instead of both. Possible criteria for making this decision (if the alert can be sent to either carer) are:

(i) If one carer is still not fully asleep while the other one is, then the one that is awake is notified.
(ii) If one carer is in deep sleep stage while the other one is in light sleep or REM sleep, the latter one is notified.
(iii) If one carer went to sleep much earlier than the other carer, then this carer is notified since he/she has had more rest.

Of course, if an alert for one particular crying type is configured to be sent always to one particular carer (e.g. the mother) this may override the sleep analysis, and the mother will have to be woken.

Other baby specific data may also be taken into account, such as historically derived waking patterns. For example, a history log can be built up, recording which carer gets up for the baby over time. This can be fed back to influence the wake up-decision making, and can be used to analyze the influence of the waking up on the sleep patterns of the carers, etc. The history log may include any data from the device, such as when the baby started to cry, which type of crying, to whom the alert was directed, the response time etc.

Thus, history built up over a longer period of time may be used in addition to real-time data. The history data (over the past n nights) may for example include: the number of hours of sleep, number of times each carer had been woken up. In addition it may take other data from other systems into account, e.g. if one of the carer has an early meeting in his/her agenda the next morning.

Figure 2:
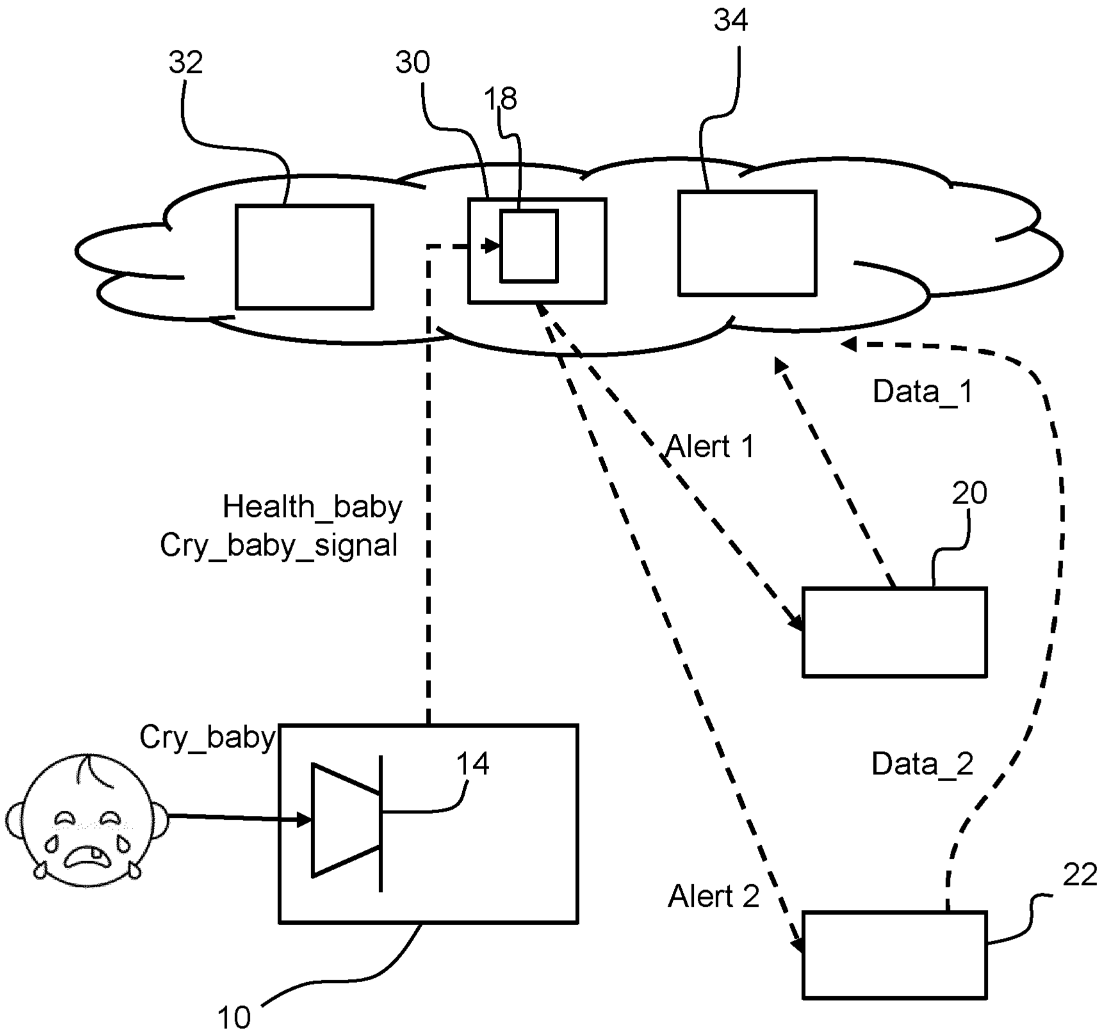
FIG. 2 shows a second example of a baby monitor system.

When multiple sources of information are used, a cloud based solution may be preferred as shown in FIG. 2.

The four types of carer data shown in FIG. 1 are represented simply as Data_1 and Data_2. This data is provided to a remote processing facility (cloud) together with a signal encoding the baby sounds Cry_baby_signal. The cry analysis by algorithm 18 takes place remotely as part of a baby monitoring server 30. The alerts Alert_1 and Alert_2 are generated remotely and sent to the carer receiver units 20, 22. There is also a remote smartwatch server 32 (e.g. providing the carer sleep and health information) and other servers such as an appointment manager 34 etc. These all communicate in order to provide the information needed to implement the alert generation rules.

The baby monitor server 30 itself keeps track of the past alert notification events. Different data from different sources are aggregated and analyzed in the baby monitor server, which takes the decision which carer eventually to notify when the baby is crying.

In addition to the cry type, schedule information and health information, time may be used as a parameter to initiate the first or second alert. For example, if the alert for a first parent is not responded to after a given time period, then the system may use the second alert, or the first alert may be generated at a higher level (e.g. volume or vibration intensity).

Figure 3:
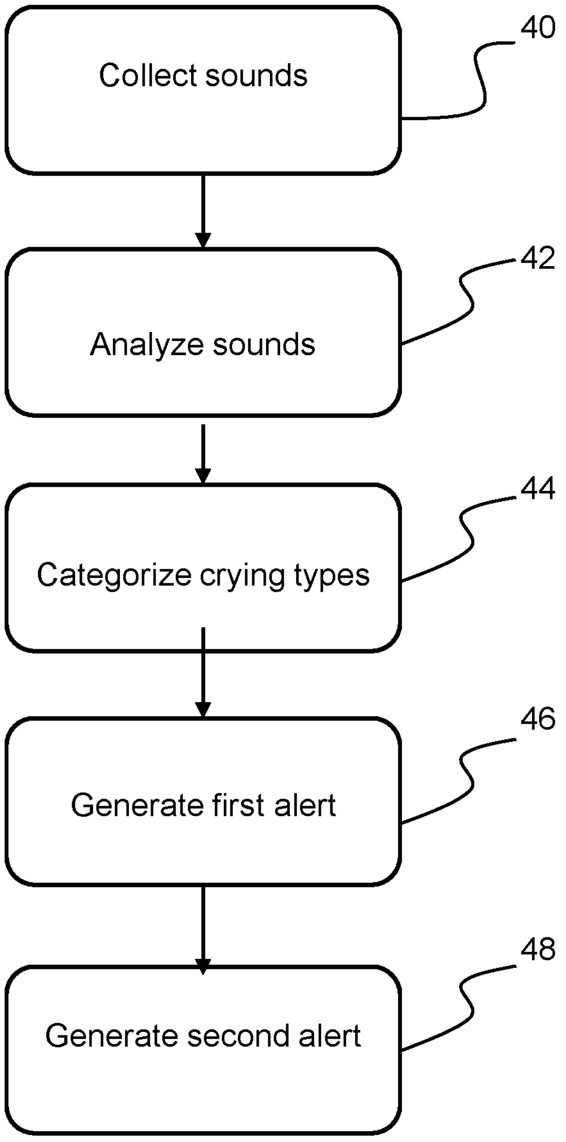
FIG. 3 shows a baby monitoring method.

FIG. 3 shows a baby monitoring method, comprising:

In step 40, collecting sounds of a baby to be monitored at a baby monitor unit; In step 42, analyzing the sounds collected by the baby monitor unit;
In step 44, identifying crying from the analyzed sounds and categorize the crying as one of a set of different crying types;
In step 46, generating a first alert trigger signal such that a first alert is provided for a first carer receiver unit in response to the crying being one of a first sub-set of crying types; and
In step 48 generating a second alert trigger signal such that a second alert is provided for a second carer receiver unit in response to the crying being one of a second sub-set of crying types, different to the first sub-set of crying types.

An audio only system is described above. The baby monitor unit may however also comprise a camera for capturing and the receiving units then comprise a display for displaying the video. Thus, the system may be an audio and video baby monitoring system.

The algorithms for crying analysis are known and commercially available. They may rely on training to the particular baby during an initial learning phase (of a machine learning algorithm) or they may not require any initial learning. The invention makes use of existing cry analysis and thus the detailed implementation of the cry analysis algorithm is not described.

The invention has been described in connection with a system for two carers such as two parents. It may however be used for more than two carers, such as grandparents or multiple babysitters, or multiple medical staff looking after a ward of babies.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. (optional)

If the term "adapted to" is used in the claims or description, it is noted the term "adapted to" is intended to be equivalent to the term "configured to".

Any reference signs in the claims should not be construed as limiting the scope.

The invention claimed is:

1. A baby monitor system, comprising:

a baby monitor unit having a microphone for collecting sounds of a baby to be monitored and an output system for providing alerts to a plurality of carer receiver units; and a processor arrangement for triggering alerts for one or more of the plurality of carer receiver units, wherein the processor arrangement is adapted to:

analyze the sounds collected by the baby monitor unit;

identify crying from the analyzed sounds and categorize the crying as one of a set of different crying types;

generate a first alert trigger signal for generating a first alert provided to a first carer receiver unit in response to the crying being one of a first sub-set of crying types; and generate a second alert trigger signal for generating a second alert provided to a second carer receiver unit of the plurality of carer receiver units in response to the crying being one of a second sub-set of crying types, different to the first sub-set of crying types.

2. The system of claim 1, wherein the set of crying types include a hunger crying type and at least one non-hunger crying type.

3. The system of claim 2, wherein the first sub-set includes the hunger crying type and the second sub-set does not include the hunger crying type.

4. The system of claim 2, wherein the at least one non-hunger crying type includes: sleepy, discomfort, need to burp and stomach pain.

5. The system of claim 1, wherein the baby monitor unit comprises a health monitoring system, wherein the processor arrangement is further adapted to use baby health monitoring information to generate the first and second alerts.

6. The system of claim 1, wherein the processor arrangement is further adapted to use carer sleep monitoring information to generate the first and second alerts.

7. The system of claim 1, wherein the processor arrangement is further adapted to take account of carer schedule information to generate the first and second alerts.

8. The system of claim 1, wherein the processor arrangement is further adapted to take account of a response time to an alert trigger signal in order to change characteristics of the alert trigger signal or to switch to a different alert trigger signal.

9. The system of claim 1, further comprising the plurality of carer receiver units.

10. The system of claim 9, wherein each of the first and second carer receiver units comprises a smart watch and/or smartphone.

11. A baby monitoring method, comprising:

collecting sounds of a baby to be monitored at a baby monitor unit; and providing signals for triggering generation of alerts for one or more of a plurality of carer receiver units by:

analyzing the sounds collected by the baby monitor unit;

identifying crying from the analyzed sounds and categorizing the crying as one of a set of different crying types;

generating a first alert trigger signal for generating a first alert provided to a first carer receiver unit of the plurality of carer receiver units in response to the crying being one of a first sub-set of crying types; and generating a second alert trigger signal for generating a second alert provided to a second carer receiver unit of the plurality of carer receiver units in response to the crying being one of a second sub-set of crying types, different to the first sub-set of crying types.

12. The method of claim 11, wherein the set of crying types include a hunger crying type and at least one non-hunger crying type.

13. The method of claim 11, further comprising using carer sleep monitoring information to generate the first and second alerts.

14. The method of claim 11, further comprising using carer and/or baby health monitoring data to generate the first and second alerts.

15. A non-transitory computer readable medium storing computer program code that, when run on a processor arrangement of a baby monitoring system, causes the processor arrangement to:

analyze sounds of a baby received from a baby monitor unit;

identify crying from the analyzed sounds;

categorize the crying as one crying type of a set of different crying types;

generate a first alert for a first carer receiver unit in response to the crying being one of a first sub-set of crying types of the set of different crying types, wherein the first alert is provided to the first carer receiver unit; and generate a second alert for a second carer receiver unit in response to the crying being one of a second sub-set of crying types of the set of different crying types, different to the first sub-set of crying types, wherein the second alert is provided to the second carer receiver unit.

16. The method of claim 12, wherein the at least one non-hunger crying type includes at least one of sleepy, discomfort, need to burp or stomach pain.

17. The method of claim 11, further comprising using carer schedule information to generate the first and second alerts.

18. The non-transitory computer readable medium of claim 15, wherein the computer program code further causes the processor arrangement to use carer sleep monitoring information to generate the first alert and second alert.

19. The non-transitory computer readable medium of claim 15, wherein the computer program code further causes the processor arrangement to take account of carer schedule information to generate the first alert and the second alert.

20. The non-transitory computer readable medium of claim 15, wherein the set of crying types include a hunger crying type and at least one non-hunger crying type.

* * * * *